US008055840B2

(12) United States Patent
Inoue (10) Patent No.: US 8,055,840 B2
(45) Date of Patent: Nov. 8, 2011

(54) STORAGE DEVICE INCLUDING A CONTROLLER FOR REARRANGING WRITING COMMANDS

(75) Inventor: Hiroaki Inoue, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 308 days.

(21) Appl. No.: 12/414,913

(22) Filed: Mar. 31, 2009

(65) Prior Publication Data

US 2009/0262447 A1    Oct. 22, 2009

(30) Foreign Application Priority Data

Apr. 17, 2008    (JP) .................................. 2008-108274

(51) Int. Cl.
*G06F 12/00* (2006.01)
(52) U.S. Cl. .................... 711/112; 711/100; 711/151
(58) Field of Classification Search .................. 711/112, 711/100.112, 151
See application file for complete search history.

(56) References Cited

U.S. PATENT DOCUMENTS

| 5,860,083 | A | 1/1999 | Sukegawa |
| 2007/0271413 | A1 | 11/2007 | Fujibayashi et al. |

FOREIGN PATENT DOCUMENTS

| JP | 07-084880 | 3/1995 |
| JP | 10-154101 | 6/1998 |
| JP | 2003-167781 | 6/2003 |
| JP | 2007-115232 | 5/2007 |

*Primary Examiner* — Yong Choe
(74) *Attorney, Agent, or Firm* — Greer, Burns & Crain, Ltd.

(57) ABSTRACT

A storage device includes: a storage unit for writing data into a rotating storage medium via a writing head; a nonvolatile memory; a temporary storage memory for storing a plurality of writing commands temporarily; and a controller for executing the plurality of writing commands so as to selectively write data into the storage unit or the nonvolatile memory, rearranging the writing commands stored in the temporary storage memory in accordance with efficiency for executing the writing commands to write data into the storage unit, sequentially executing the rearranged writing commands in descending order, and executing in parallel at least one of the writing commands that has not been executed to write data into the nonvolatile memory until all the data to be written in accordance with the writing commands are stored in either the storage unit or the nonvolatile memory.

13 Claims, 11 Drawing Sheets

| LOGICAL ADDRESS | HEAD NUMBERS | CYLINDER NUMBERS | UNIT SECTOR NUMBERS |
|---|---|---|---|
| 0 | 0 | 0 | 10 |
| 100 | 1 | 0 | 10 |
| 200 | 2 | 0 | 10 |

| START LOGICAL ADDRESSES | ENDING LOGICAL ADDRESSES | START MEMORY ADDRESSES | FLAG DATA |
|---|---|---|---|
| 400 | 500 | 10 | 1 |
| 600 | 700 | 30 | 0 |
| 800 | 900 | 50 | 0 |

STORAGE DEVICE INCLUDING A CONTROLLER FOR REARRANGING WRITING COMMANDS

CROSS-REFERENCE TO RELATED APPLICATION

This application is based upon and claims the benefit of priority of the prior Japanese Patent Application No. 2008-108274 filed on Apr. 17, 2008, the entire contents of which are incorporated herein by reference.

FIELD

The embodiments discussed herein are related to a storage device for storing data.

BACKGROUND

Storage devices having a mechanism in which data is written on a rotating storage medium via a writing head are used as nonvolatile large-capacity storage devices for various kinds of applications. Typical examples of such storage devices include magnetic disk devices. Also, optical disk devices, magneto-optical disk devices, etc., are classified into such a category. Such a storage device is capable of writing serial data at a considerably high data writing rate. However, such a storage device requires a waiting period for mechanically moving a writing head to a specified region. This leads to a problem of a slow random access rate. In particular, such a storage device has a problem in that, in some cases, the access time from the execution of a writing command up to the start of a writing operation is significantly delayed, depending upon the position at which the writing head was located immediately before the execution of the writing command.

Compared to rotating storage devices, nonvolatile memory devices such as flash memory have the advantage of a high random access rate, and the advantage of small irregularities in access time depending upon the region (address). In recent years, the capacities of such nonvolatile memory devices have increased dramatically, and they have begun to be used as a substitute for rotating storage devices in some fields of application. However, nonvolatile memory has a problem in that there is a limit to the number of times data can be repeatedly written to the same storage region. For example, nonvolatile memory has the disadvantage that writing data one hundred thousand times or more deteriorates the storage performance of a storage cell. In order to compensate for this disadvantage, a combination of a rotating storage device (unit) and a nonvolatile memory device has been proposed as discussed in Japanese Laid-open Patent Publication No. 2007-115232, Japanese Laid-open Patent Publication No. H07-84880, Japanese Laid-open Patent Publication No. H10-154101, and Japanese Laid-open Patent Publication No. 2003-167781.

SUMMARY

According to an aspect of an embodiment, a storage device includes: a storage unit including a rotating storage medium and a writing head for writing data into the rotating storage medium via the writing head; a nonvolatile memory; a temporary storage memory for storing a plurality of writing commands temporarily; and a controller for executing the plurality of writing commands so as to selectively write data into the storage unit or the nonvolatile memory, wherein the controller rearranges the plurality of writing commands stored in the temporary storage memory in accordance with efficiency for executing the writing commands to write data into the storage unit, sequentially executes the plurality of the rearranged writing commands in descending order, and executes in parallel at least one of the writing commands that has not been executed to write data into the nonvolatile memory until all the data to be written in accordance with the plurality of writing commands are stored in either the storage unit or the nonvolatile memory.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE PREFERRED EMBODIMENTS

These embodiments include techniques for scheduling the order of steps to be executed according to a plurality of writing commands so as to provide an optimized writing rate in the overall operation of the storage device.

Figure 1:
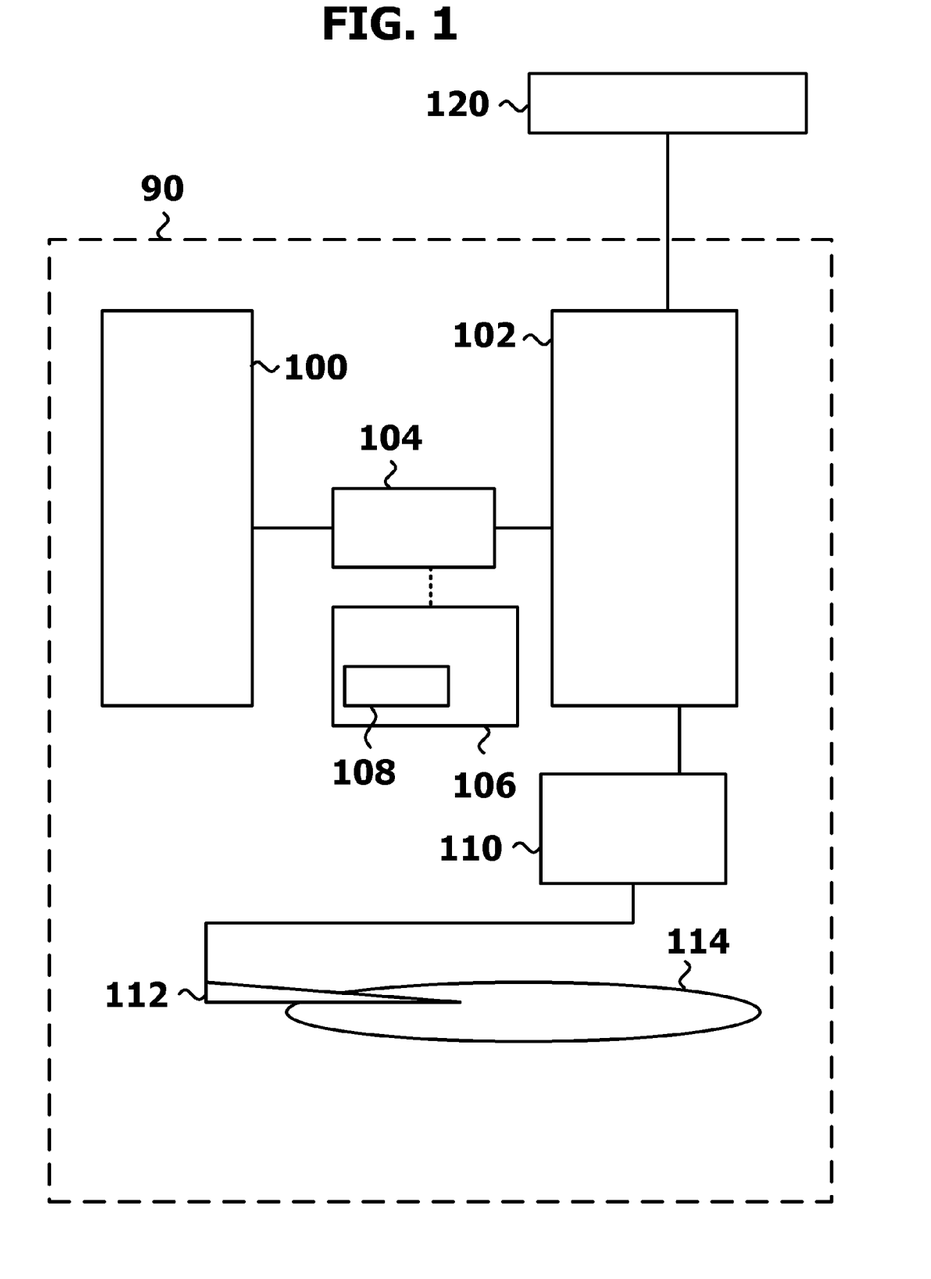
FIG. 1 is a diagram which illustrates an overall configuration of a device.

FIG. 1 is a diagram which illustrates an overall configuration of a storage device 90. The storage device 90 includes nonvolatile memory 100, temporary storage memory 102, a memory controller 104, a controller 106, an A/D conversion unit 110, a magnetic head 112, and a storage medium 114. The magnetic head 112 functions as a writing head which writes data to a given position on the storage medium 114, and as a readout head which reads out data from a given position on the storage medium 114. A writing unit having a writing mechanism in which data is written to the rotating storage medium 114 via the writing head will be referred to as a storage unit.

The storage medium 114 stores data transmitted from a host apparatus 120. In general, the storage medium 114 includes a plurality of disks, and a magnetic head 112 is provided for each of these disks. Each of the regions obtained by dividing the entire area of the disk in a concentric fashion is referred to as a track. Each of the regions obtained by dividing the track in a radial fashion is referred to as a sector.

Furthermore, a region obtained by a numerical stack of tracks of the same size across the respective disks is referred to as a cylinder.

The controller 106 is a computation device which controls the memory controller 104, the A/D conversion unit 110, and so forth. The controller 106 can be provided using a computation device such as an MPU (Micro Processing Unit) or the like. Furthermore, the controller 106 includes a counter 108 which counts the number of times data is written to the nonvolatile memory 100 according to writing commands.

The nonvolatile memory 100 provides a part of the storage area, and is a memory device such as flash memory or the like, which stores data even after the supply of power is stopped. The nonvolatile memory 100 functions as storage memory which stores data transmitted from the host apparatus 120.

The temporary storage memory 102 functions as memory which temporarily stores data to be written and readout commands received from a circuit external to the storage device, and readout data to be transmitted to a circuit external to the storage device. The information stored in the temporary storage memory 102 is lost after the supply of power to the storage device is stopped.

The memory controller 104 writes data to the nonvolatile memory 100, reads out data from the nonvolatile memory 100, and so forth.

The A/D conversion unit 110 converts a digital signal of data stored in the temporary storage memory 102 into an analog signal which can be stored in the storage medium 114.

The host apparatus 120 is a host system which transmits data writing commands and data readout commands to the storage device 90. The host apparatus 120 is an apparatus external to the storage device 90.

The temporary storage memory 102 stores a sequence of data writing commands transmitted from the host apparatus 120. The sequence of writing commands is composed of a set of a plurality of data writing commands stored before execution in the temporary storage memory 102. The controller 106 rearranges the sequence of writing commands stored in the temporary storage memory 102. Here, the term "waiting time" as used here represents a period of time required for moving a head before execution of the next writing command. The term "rearrangement" as used here represents an operation for determining the order of steps to be executed according to the writing commands efficiency for writing to the storage medium 114, e.g., in descending order of waiting time. Also, in case a great amount of data is to be written according to a single writing command, the waiting time may be defined to be the sum of the period required for moving the head and the period required for writing the data. This allows a sequence of writing commands to be rearranged giving consideration to the data writing time.

The controller 106 executes the sequence of writing commands thus rearranged for the storage medium 114 in descending order of waiting time. At the same time, in a different manner, the controller 106 selects writing commands from the rearranged sequence of writing commands which have not been executed, and executes the writing commands thus selected for the nonvolatile memory 100. For example, the controller 106 may execute the writing commands for the nonvolatile memory 100 in ascending order of waiting time.

This allows the loss of writing time due to the waiting time for the storage medium 114 to be reduced, thereby improving the writing performance in the overall operation of the storage device, and the writing time for the storage device can be reduced.

Furthermore, the controller 106 counts the number of times data has been written in increments of specified regions of the nonvolatile memory 100. Here, in the description of the flash memory, the term "specified region" as used here represents a block. The flash memory performs the data writing operation and the data erasing operation in increments of blocks.

In a case in which the number of times data has been written to a specified region of the nonvolatile memory 100 has reached a predetermined number or more, when the controller 106 executes a writing command for the nonvolatile memory 100, the controller 106 also executes this writing command for the storage medium 114. With such an arrangement, the data written to the nonvolatile memory 100 is also stored in the storage medium 114, thereby improving the data storage reliability.

Furthermore, in case the number of times data has been written to a specified region of the nonvolatile memory 100 is less than a predetermined number or more, the controller 106 does not execute a writing command for the storage medium 114, and executes this writing command for the nonvolatile memory 100. Such an arrangement reduces the number of times that unnecessary commands are executed, thereby providing an improved data writing rate to the storage device.

Furthermore, when the storage device receives a sequence of readout commands from the host apparatus 120, the sequence of readout commands is temporarily stored in the temporary storage memory 102. The sequence of readout commands is a sequence of a plurality of data readout commands which are transmitted to the storage device 90 and are stored in the temporary storage memory 102 before execution. The controller 106 rearranges the sequence of readout commands stored in the temporary storage memory 102 such that the readout commands for the nonvolatile memory 100 and the readout commands for the storage medium 114 are alternately arranged.

First, the controller 106 executes a readout command for the nonvolatile memory 100, and transmits the data thus read out to the host apparatus 120. Simultaneously with this, the controller 106 executes a readout command for the storage medium 114, and transmits the data thus read out to the temporary storage memory 102. This allows the data readout operation for the nonvolatile memory 100 to compensate for the loss of readout time that occurs due to the waiting time required for the rotation operation of the storage medium 114 and so forth. Furthermore, such an arrangement allows the data stored in the temporary storage memory 102 to be transmitted to the host apparatus 120 during the execution of the next readout command for the nonvolatile memory 100, thereby improving the data readout efficiency.

Figure 2:
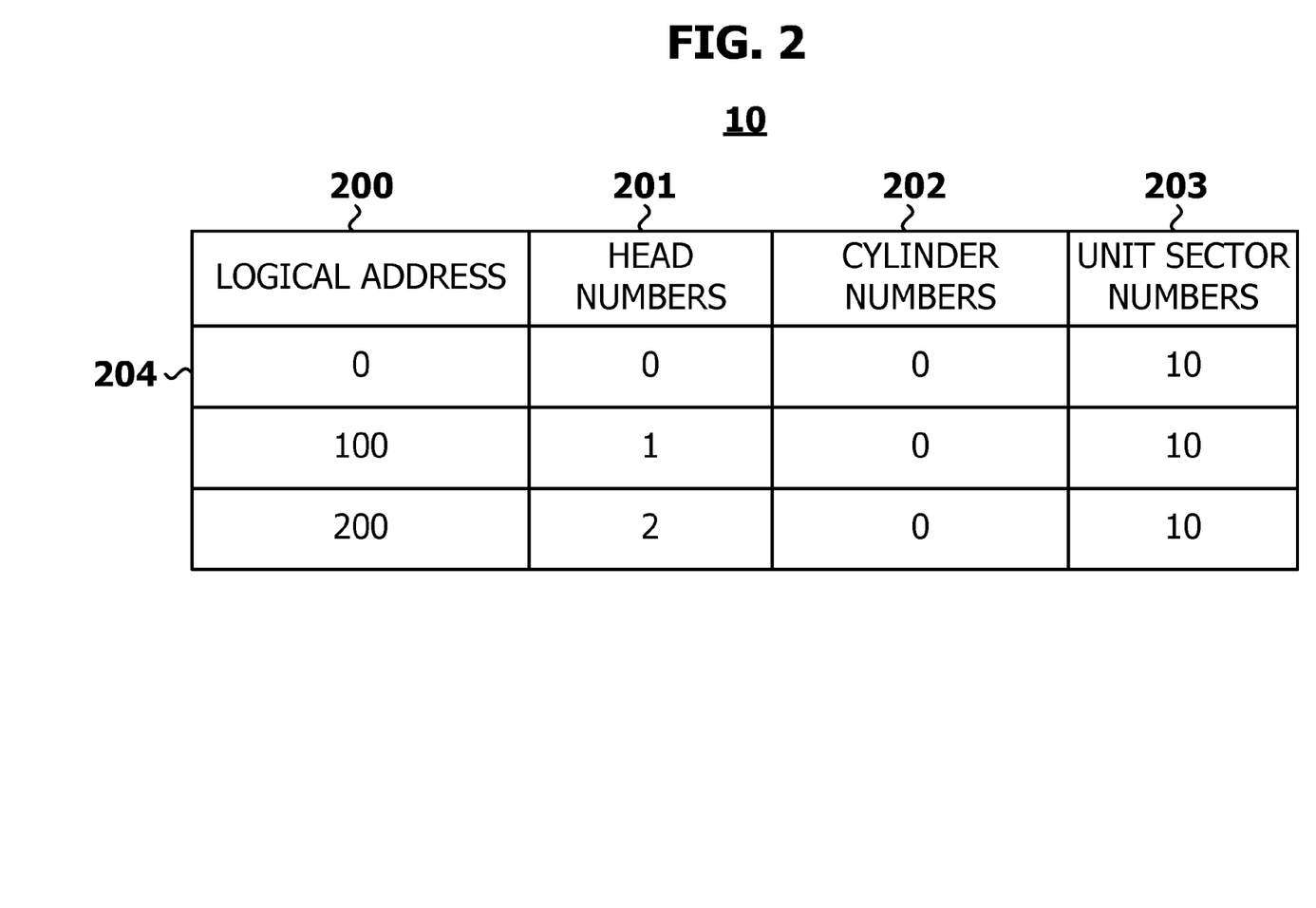
FIG. 2 illustrates a disk address conversion table.

FIG. 2 illustrates a disk address conversion table 10 which represents the relation between the logical address used in the writing command and the physical address used in the storage medium 114. The writing command includes the logical address of the writing destination and the amount of data to be written. The disk address conversion table 10 is prepared and stored beforehand in the storage medium 114, and is expanded in the temporary storage memory 102 or the like when the storage device 90 is started up. The controller 106 determines the sector to which data is to be written, based upon the logical address in the writing command and the disk address conversion table 10.

Column 200 illustrates the logical addresses that correspond to the writing commands. A logical address is assigned to each of the sectors of the storage medium 114. Accordingly, column 200 stores only the logical addresses that correspond to the start sectors of the respective cylinders, in increments of magnetic heads.

Column 201 illustrates the head numbers that correspond to the logical addresses included in column 200. Accordingly, the data that corresponds to row 204, i.e., the data that corresponds to the logical addresses "0" to "99", is stored with the head number "0". A head is provided for each of the magnetic disks of the storage medium 114. Accordingly, it can be understood from the disk address conversion table 10 that the storage device includes at least three magnetic disks.

Column 202 illustrates the start cylinder numbers that correspond to the logical addresses shown in column 200. Accordingly, it can be understood that the data included in row 204, i.e., the data that corresponds to the logical addresses "0" to "99", is stored with the head number "0" and a corresponding cylinder number that starts with "0".

Column 203 illustrates the unit sector numbers for each of the cylinders which are associated with column 202. Accordingly, from the data included in row 204, in which each cylinder starts with the head number "0" and the cylinder number "0", it can be understood that the number of sectors is 10. For example, in a case in which the logical address in the writing command is "35", the physical address is obtained according to the following procedure. That is to say, the logical address included in column 200 is subtracted from this given logical address, and the subtraction thus obtained is divided by the unit sector number included in column 203, which is represented by the following Expression: (35−0)/10=3, remainder 5. Accordingly, it can be understood that the logical address "35" corresponds to the physical address for which the head number is "0", the cylinder number is "3", and the sector number is "5".

Figure 3:
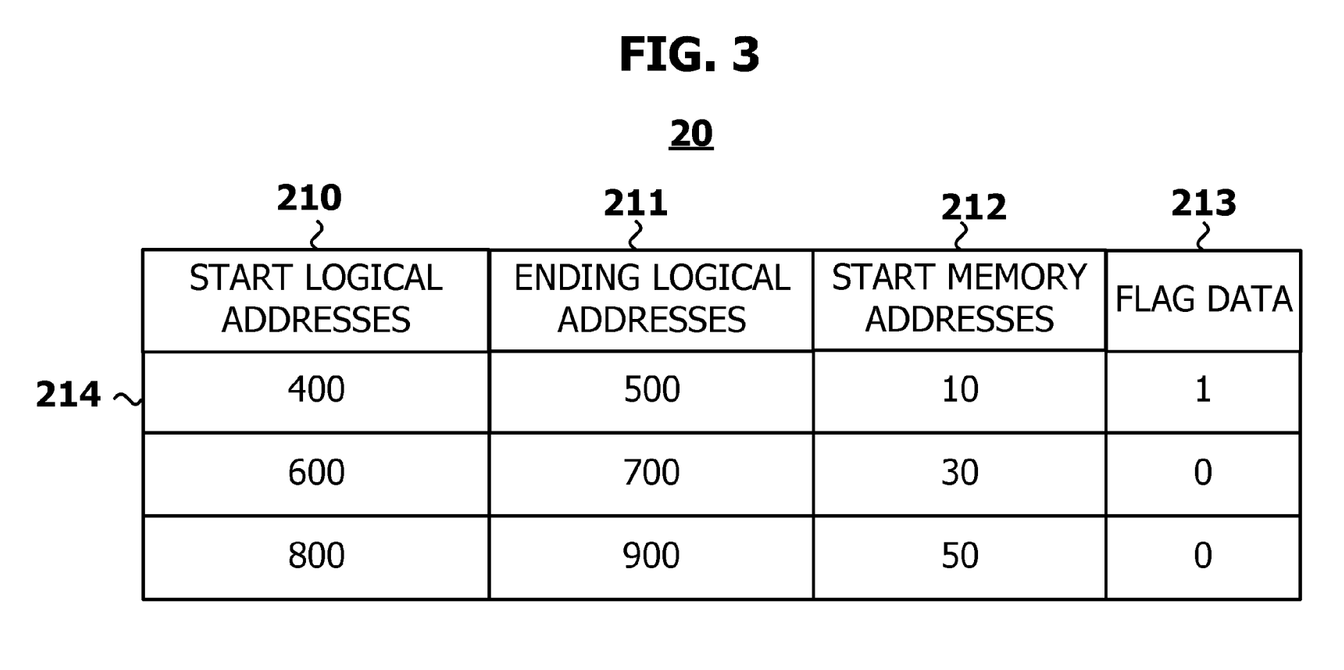
FIG. 3 illustrates a memory address conversion table.

FIG. 3 illustrates a memory address conversion table 20 which represents the relation between the logical address used in the writing command and the physical address used in the nonvolatile memory 100. The memory address conversion table 20 is stored in the nonvolatile memory 100. The controller 106 updates the memory address conversion table 20 every time data is written. When data is to be read out, in a case in which the logical address that corresponds to the logical address included in the readout command has not been found in the memory address conversion table 20, the controller 106 judges that the data that corresponds to this readout command has been stored in the storage medium 114.

Column 210 illustrates the start logical addresses that correspond to the start addresses of the data stored in the nonvolatile memory 100. Column 211 illustrates the ending logical addresses that correspond to the ending addresses of the data stored in the nonvolatile memory 100. Column 212 illustrates the start memory addresses of the data stored in the nonvolatile memory 100 that correspond to the start logical addresses included in column 210. Accordingly, from the data included in row 214, it can be understood that data written according to a writing command with a logical address from "400" to "500" is stored in a region that starts with the start memory address "10". More specifically, when data is written according to a writing command with the logical address "430", the memory address is obtained according to the following procedure. That is to say, the start logical address "400" included in column 210 is subtracted from this logical address "430", and the start memory address "10" included in column 212 is added to the subtraction thus calculated, as represented by the following Expression: (430−400)+10=40. Accordingly, the logical address "430" corresponds to the memory address "40" of the nonvolatile memory 100.

Column 213 illustrates flag data which indicates whether or not the same data is in the storage medium 114. When the same data has been written to the storage medium 114, the flag data is set to "1". Otherwise, the flag data is set to "0". The same data is written to a sector such that it can be referred to using the same logical address. This allows the same data to be read out from the nonvolatile memory 100 and the storage medium 114 using the same logical address included in the readout command. Thus, even in a case in which the data stored in the nonvolatile memory 100 cannot be read out therefrom, the same data can be read out from the storage medium 114.

Figure 4:
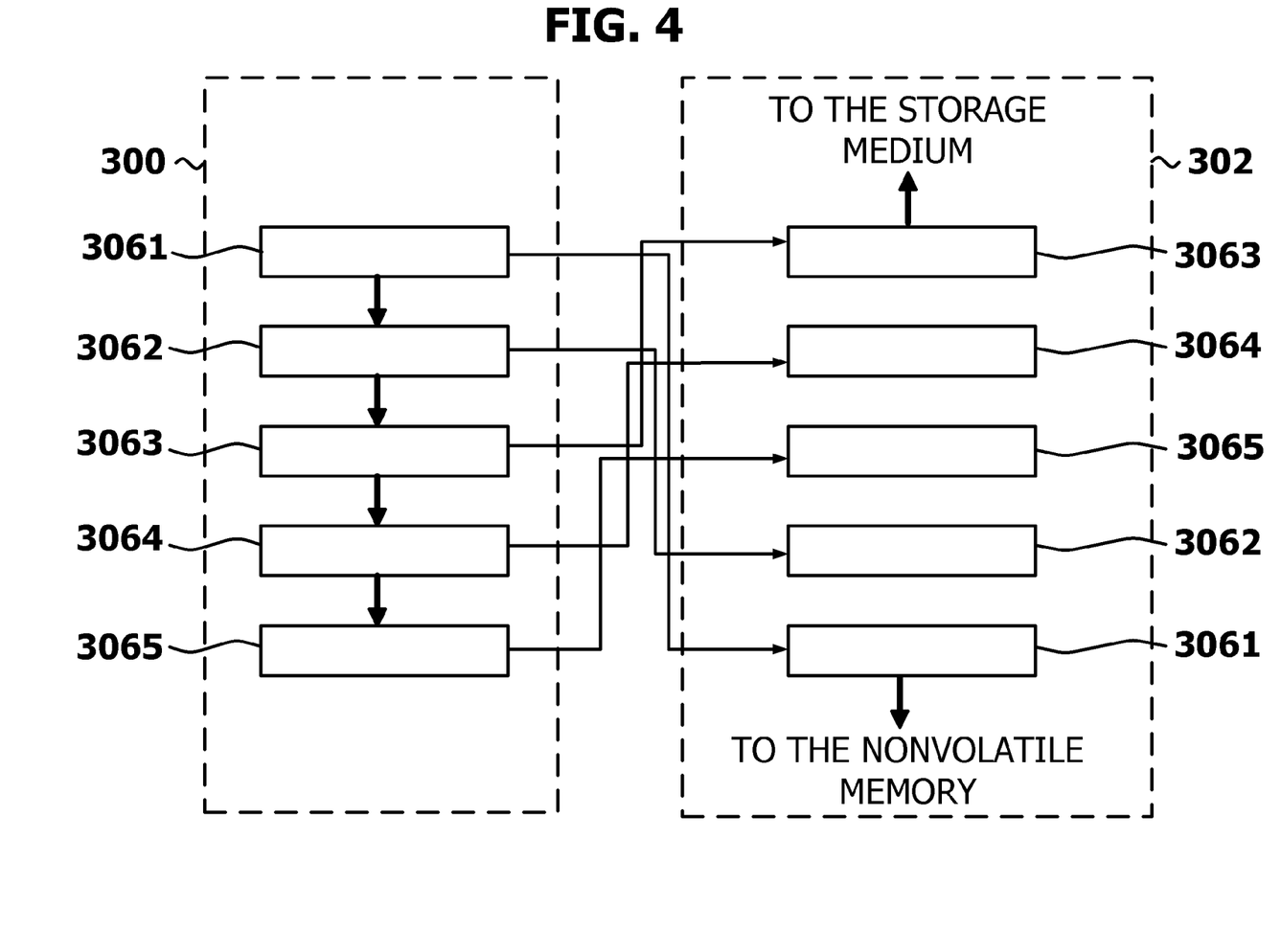
FIG. 4 is a diagram which illustrates sequences of writing commands.

FIG. 4 is an explanatory diagram for describing the steps executed according to a sequence of writing commands issued by the host apparatus 120.

The sequence 300 is a sequence of writing commands transmitted from the host apparatus 120. In the sequence 300, the writing commands 3061 to 3065 are data writing commands which have been transmitted from the host apparatus, and are stored in the temporary storage memory 102. In the present embodiment, the number of writing commands is five, but the number of commands is not limited to five. Each of the writing commands 3061 to 3065 includes a logical address. The physical address used to write data to the storage medium 114 can be obtained using this logical address and the disk address conversion table 10.

The sequence 302 is a writing command sequence which has been rearranged. The rearrangement processing is executed by the controller 106. In the present embodiment, the controller 106 converts the logical address included in each writing command into a sector number based upon the disk address conversion table 10, and rearranges the writing commands 3061 to 3065 in descending order of waiting time required for the movement of the head between the sectors. In a case in which the controller 106 has detected that there are two or more writing commands in the temporary storage memory 102, the controller 106 executes the rearrangement processing. Furthermore, in a case in which a new writing command is transmitted from the host apparatus 120 to the temporary storage memory 102 during the subsequent writing operation, the controller 106 executes the rearrangement processing after the completion of the writing commands which were being executed when the new writing command was transmitted.

Description will be made regarding the sequence 302 as an example. The controller 106 calculates that the writing command 3063 includes a logical address that corresponds to a sector number which requires the smallest waiting time for moving the head from the current head position, and determines this writing command to be the command to be executed first in this execution sequence. Next, the controller 106 calculates that the writing command 3064 includes a logical address that corresponds to a sector number which requires the smallest waiting time for moving the head from a base position set to the sector number that corresponds to the writing command 3063, and determines this writing command to be the command to be executed second in this execution sequence. In the same way, the controller 106 determines the execution sequence including all the writing commands such that the smallest waiting time is obtained for each writing command 3061 to 3065 based upon the sector number that corresponds to the logical address included therein.

Furthermore, the controller 106 executes the rearranged writing commands for the storage medium 114 and the nonvolatile memory 100 in parallel.

The controller 106 executes the writing commands 3061 to 3065 in descending order of waiting time for the storage medium 114, for which the writing rate is affected by the waiting time. Simultaneously with such execution, the controller 106 executes the writing commands 3061 to 3065 in ascending order of waiting time for the nonvolatile memory 100, for which the writing rate is independent of the waiting time. This improves the writing rate at which data is written to the storage unit 106, and reduces the number of writing commands for the storage unit 106. Thus, such an arrangement improves the writing efficiency, and avoids a situation in which the temporary storage memory 102 runs out of space.

The amount of data to be written can be obtained from the content of the writing command. Accordingly, the controller 106 can estimate the writing time when the controller 106 executes the writing command for the storage medium 114 and the writing command for the nonvolatile memory 100. The writing rate for the storage medium 114 and the writing rate for the nonvolatile memory 100, each of which is necessary for the calculation of the writing time, are stored beforehand in the nonvolatile memory 100 or the like.

For example, in a case in which the writing rate per unit of data for the nonvolatile memory 100 is greater than that for the storage medium 114, the controller 106 may rearrange the sequence of the writing commands based upon the writing time calculated by the amount of data to be written. The controller 106 executes the writing commands for the storage medium 114 in descending order of writing time. At the same time, the controller 106 executes the writing commands for the nonvolatile memory 100 in ascending order of writing time. This improves the data writing efficiency.

Also, the controller 106 may perform rearrangement processing based upon the sum of the aforementioned waiting time and the writing time when the writing command is executed for the storage medium 114. Such an arrangement provides a command sequence rearranged giving consideration to the writing time and the waiting time required for writing the data to the storage medium 114, thereby providing improvement in the efficiency of the data writing operation.

Also, the controller 106 may divide a plurality of unexecuted writing commands such that, after the command execution sequence has been rearranged, the writing time required for the storage medium 114 is equal to or smaller than that required for the nonvolatile memory 100. The reason why the commands are divided is that the data writing time for the storage medium 114 should be equal to or smaller than the data writing time for the nonvolatile memory 100, giving consideration to the waiting time required for writing data to the storage medium 114.

For example, let us consider an example in which the same amount of data is to be written according to each writing command, and each item of data is written to the storage medium 114 and the nonvolatile memory 100 at the same writing rate. In this case, the controller 106 sets the writing commands 3063 and 3064, which are included in the sequence, to be the writing commands for the storage medium 114. Furthermore, the controller 106 divides the writing commands 3065, 3062, and 3061 for the nonvolatile memory 100. The controller 106 executes the writing commands thus divided for the nonvolatile memory 100. Such an arrangement improves the writing efficiency regardless of the order of the writing commands to be executed for the nonvolatile memory 100.

Figure 5:
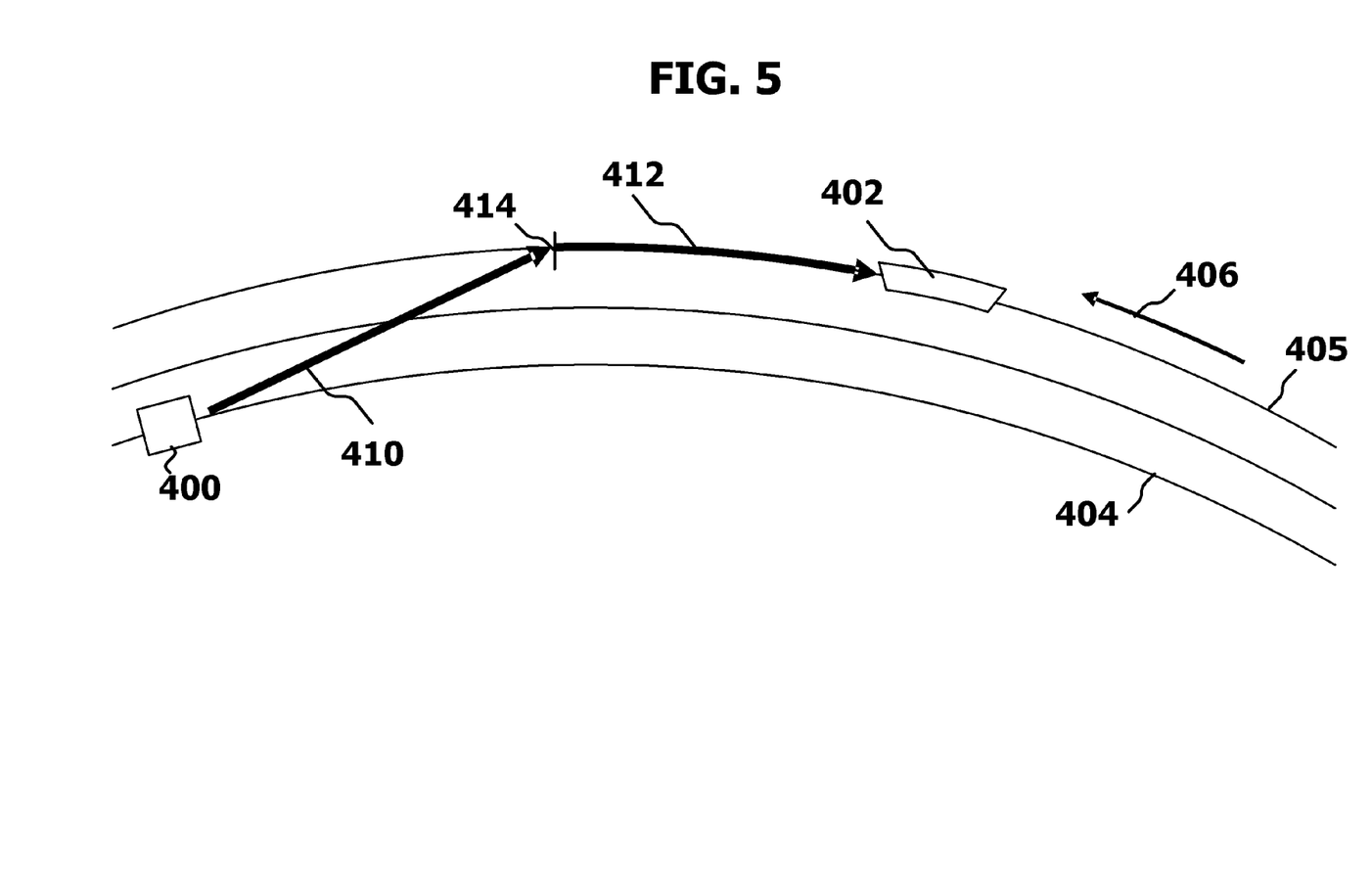
FIG. 5 is an expanded diagram which illustrates a storage unit.

FIG. 5 is an expanded diagram for describing the waiting time, which illustrates the storage medium 114. The position 400 indicates the current position of the magnetic head 112. The sector 402 indicates the sector position that corresponds to the writing start position which is referred to when a writing command is executed. The track 404 indicates a track which is referred to by the magnetic head 112 at the current position. The track 405 indicates a track including the sector 402. The arrow 406 indicates the rotation direction of the storage medium 114.

The arrow 410 indicates the seek time required for the magnetic head 112 to move from the track 404 to the track 405. The storage medium 114 rotates at a constant speed. Accordingly, the movement distance indicated by the arrow 410 can be obtained based upon the distance between the tracks and the rotation speed of the storage medium 114. The seek time can be obtained based upon the movement distance and the head movement speed. The position 414 indicates the head position at the point in time at which the magnetic head 112 reaches the track 405.

The arrow 412 indicates the rotation waiting time required for the magnetic head 112 to move from the position 414 at which the magnetic head 112 has reached the track 405 up to the sector 402. The storage medium 114 rotates at a constant speed. Accordingly, by obtaining the position 414 as described above, the movement distance from the position 414 to the sector 402 can be obtained. Accordingly, the rotation waiting time ban be obtained based upon the movement distance thus obtained and the rotation speed of the storage medium 114.

The sum of the seek time and the rotation waiting time thus obtained will be referred to as the "waiting time". In a case in which the data writing rate for the nonvolatile memory 100 is smaller than the data writing rate for the storage medium 114, the waiting time becomes the dominant factor in the difference between their writing rates when the writing commands are executed. Accordingly, it becomes important for the determination of the data writing sequence for the nonvolatile memory 100 to give consideration to the waiting time required for the storage medium 114.

In a case in which a small amount of data is to be written, the seek time and the rotation waiting time are the dominant factors with respect to the data writing time. On the other hand, in a case in which a great amount of data is to be written, the data writing time cannot be ignored. Accordingly, by giving consideration to the data writing time as an additional factor of the waiting time, such an arrangement allows the writing command sequence to be determined, i.e., rearranged with higher efficiency.

Figure 6:
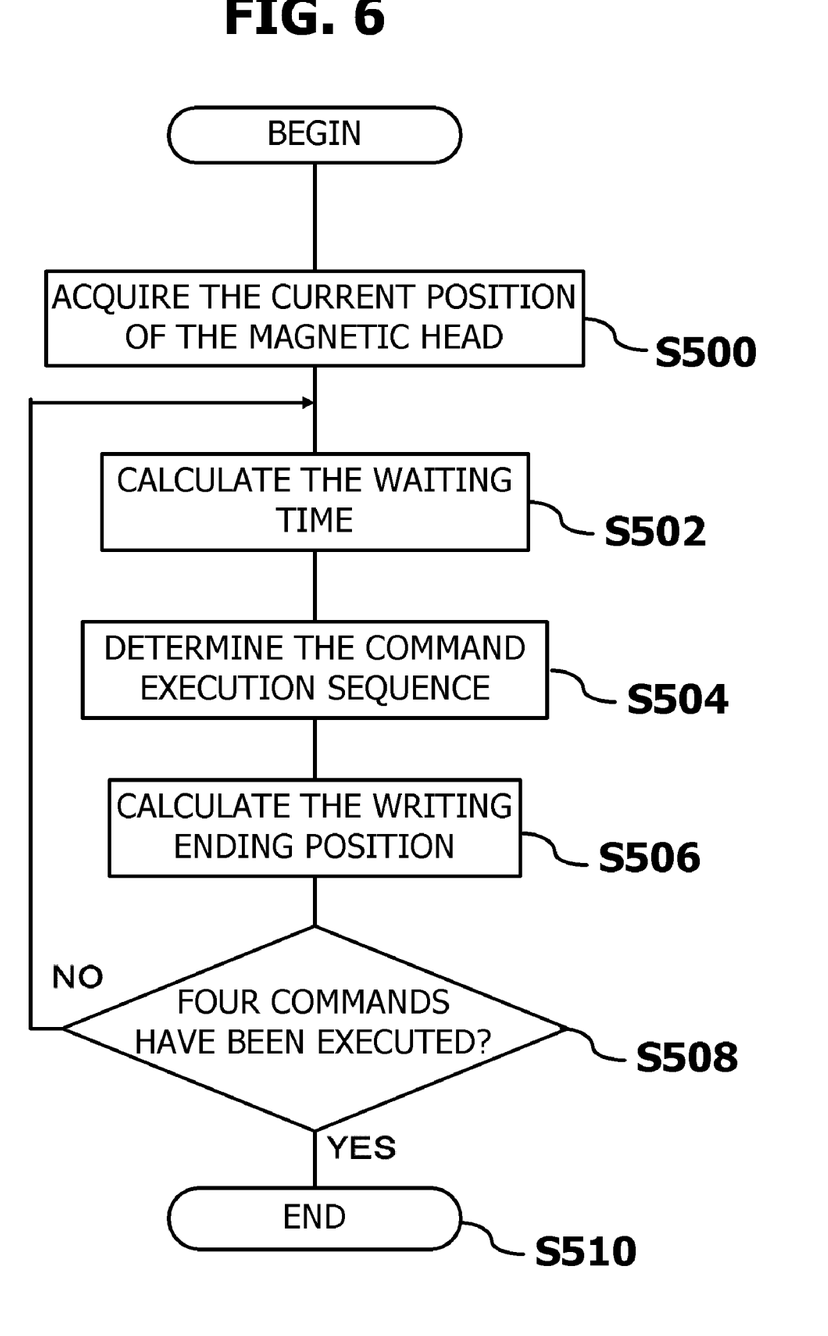
FIG. 6 is a flowchart which illustrates rearrangement processing.

FIG. 6 is a flowchart which illustrates the rearrangement processing. Description will be made below regarding an arrangement in which a sequence of n writing commands is rearranged. Also, a sequence of readout commands can be rearranged in the same way.

The controller 106 acquires the current position of the magnetic head 112 (S500). Based upon the data writing start positions that respectively correspond to the five writing commands transmitted to the temporary storage memory 102, the controller 106 calculates the waiting time which will be required for the magnetic head 112 for the execution of each of the n writing commands (S502). The controller 106 determines the command execution sequence in a manner such that the command which requires the smallest waiting time, which has been obtained by calculation, is set to be the command to be executed first (S504). The controller 106 calculates the writing ending position for the data to be written by executing the writing command according to the sequence (S506).

In a case in which four commands have not been executed according to the command execution sequence (in a case of "NO" in S508), the controller 106 calculates, based upon the writing ending position calculated in Step S506, the waiting time which will be required for the magnetic head 112 for each of the remaining writing commands to be executed (S502). The controller 106 determines the writing command to be executed as the next command based upon the waiting time thus calculated (S504). The controller 106 repeatedly performs the same processing. After the controller 106 has repeatedly executed the rearrangement processing four times, the controller 106 ends this processing (in a case of "YES" in Step S508). By executing the rearrangement processing as described above, five writing commands can be executed with the minimum waiting time for the magnetic head 112. Thus, such an arrangement reduces the data writing time for the storage medium 114.

Figure 7:
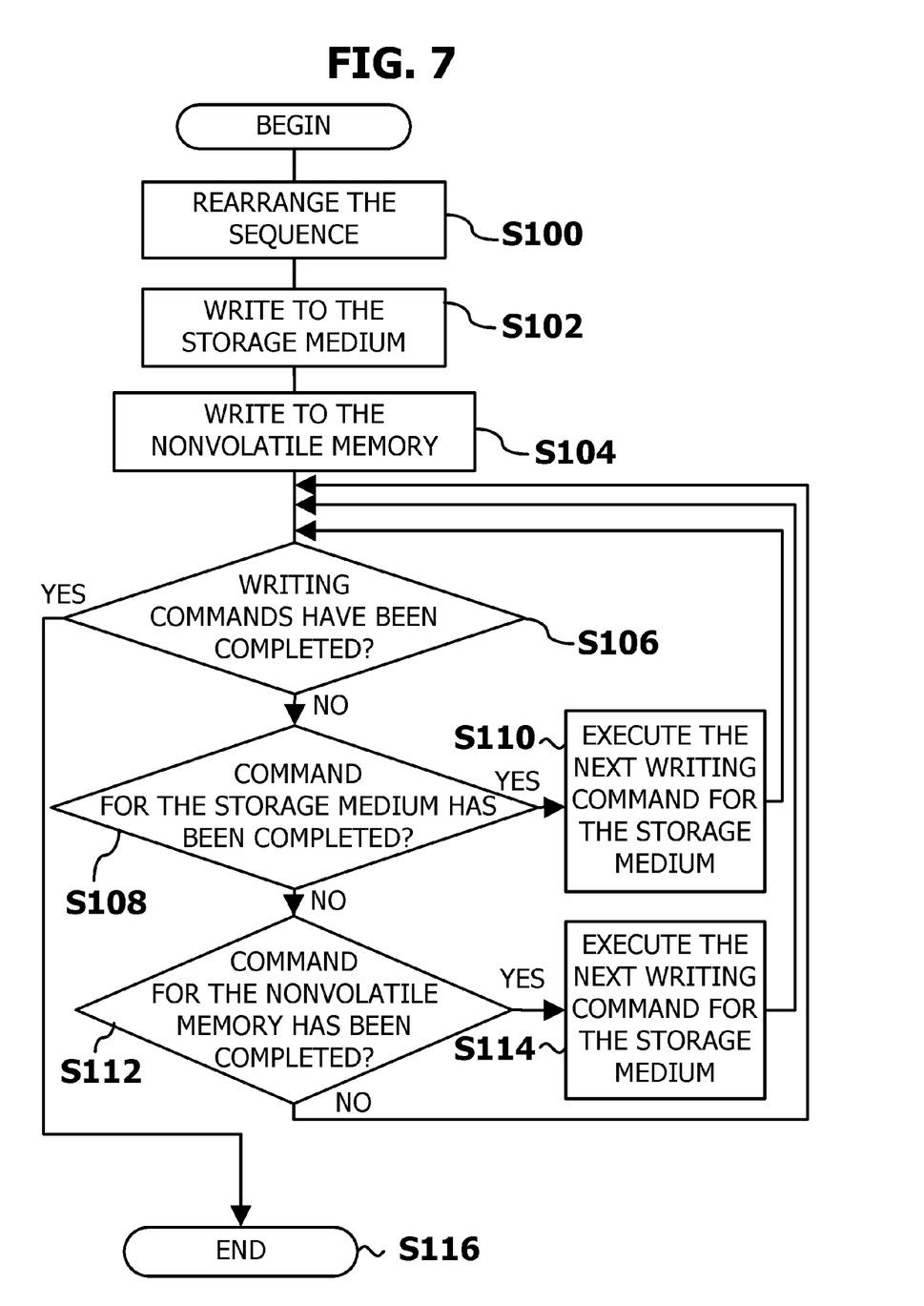
FIG. 7 is a flowchart which illustrates data writing processing.

FIG. 7 is a flowchart which illustrates the data writing operation for the storage device 90.

The controller 106 rearranges a sequence of writing commands transmitted from the host apparatus 120 to the temporary storage memory 102 such that they are written to the storage medium 114 with optimum writing performance. In the case of the sequence 300, the controller 106 rearranges the sequence in descending order of waiting time based upon the logical address of each writing command 3061 to 3065, thereby obtaining the rearranged sequence as represented by the sequence 302 (S100).

The controller 106 executes the writing commands for the storage medium 114 in descending order of waiting time according to the sequence of writing commands thus rearranged. In the case of the sequence 302, the controller 106 executes the writing commands for the storage medium 114 in descending order starting with the writing command 3063. The controller 106 removes the writing command thus executed from the temporary storage memory 102 (S102).

At the same time, the controller 106 executes the rearranged sequence of writing commands for the nonvolatile memory 100 in ascending order of waiting time, for example. After the execution of the writing command, the controller 106 removes the writing command thus executed from the temporary storage memory 102. Accordingly, in a case in which there is a writing command which has been executed for the nonvolatile memory 100 in the writing commands which are to be executed for the storage medium 114 in descending order of waiting time, the controller 106 executes writing processing for the storage medium 114 according to the sequence starting with the next writing command from the aforementioned executed writing command.

Furthermore, the controller 106 writes, in the form of the memory address conversion table 20, the logical address included in the writing command and the memory address in the nonvolatile memory 100 to which the data has been written. In the case of the sequence 302, the controller 106 executes the writing commands for the nonvolatile memory 100 according to the sequence starting with the writing command 3061. After the execution of the writing command, the controller 106 writes, in the form of the memory address conversion table 20, the logical address included in the writing command 3061 and the memory address in the nonvolatile memory 100 to which the data has been written (S104).

In a case in which all the writing commands have been completed (in a case of "YES" in S106), the controller 106 ends the writing processing (S116). In a case in which there is an unexecuted writing command (in a case of "NO" in S106), the controller 106 checks the writing command execution state of the storage medium 114. In the case of the sequence 302, the controller 106 checks whether or not the writing command 3061 to 3065 is being executed for the storage medium 114 (S108).

In a case in which the writing command for the storage medium 114 has been completed (in a case of "YES" in S108), the controller 106 executes the next writing command for the storage medium 114. In the case of the sequence 302, the controller 106 executes the writing command 3061 to 3065 for the storage medium 114 (S110). In a case in which the writing command for the storage medium 114 has not been completed (in a case of "NO" in S108), the controller 106 checks the writing command execution state of the nonvolatile memory 100. In the case of the sequence 302, the controller 106 checks whether or not the writing command 3061 to 3065 is being executed for the nonvolatile memory 100 (S112).

In a case in which the writing command for the nonvolatile memory 100 has been completed (in a case of "YES" in S112), the controller 106 executes the next writing command for the nonvolatile memory 100. In the case of the sequence 302, the controller 106 executes the writing command 3061 to 3065 for the nonvolatile memory 100 (S114). In a case in which the writing command for the nonvolatile memory 100 has not been completed (in a case of "NO" in S112), the flow returns to the processing in Step S106, and the steps following the Step S106 are repeatedly performed until the writing commands have been completed for either the storage medium 114 or the nonvolatile memory 100.

As described above, the writing commands are executed for the storage medium 114 and the nonvolatile memory 100 in parallel, and the processing is repeatedly performed until all the writing commands are completed. This improves the writing efficiency of the storage medium 114, and reduces the number of writing commands executed for the storage medium 114. As a result, such an arrangement reduces the writing time required for writing data to the storage device, and reduces the number of times data is repeatedly written to the nonvolatile memory 100.

Figure 8:
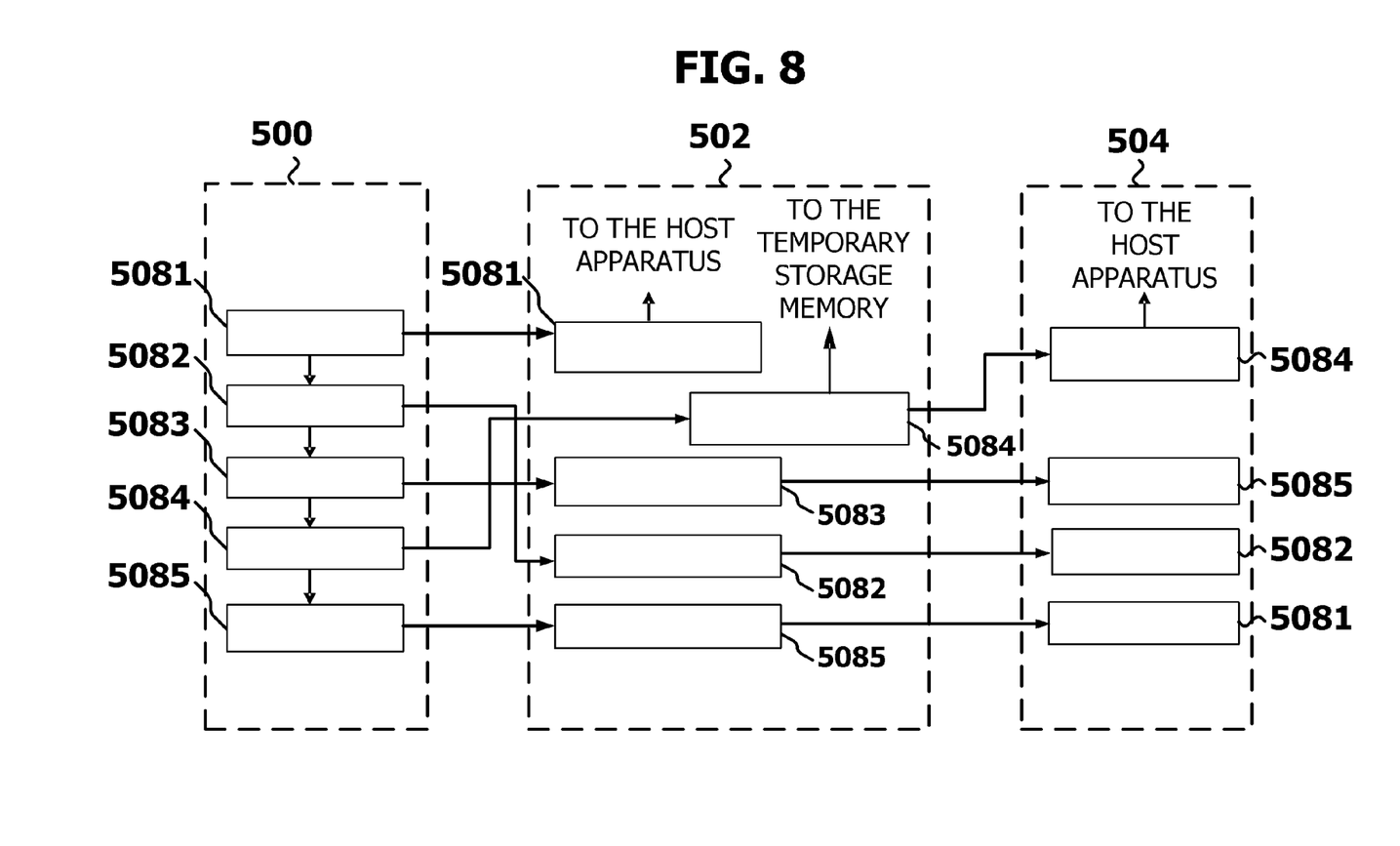
FIG. 8 is a diagram which illustrates sequences of data readout commands.

FIG. 8 is an explanatory diagram for describing the processing executed according to a sequence of readout commands issued from the host apparatus 120.

The sequence 500 is a sequence of readout commands transmitted from the host apparatus 120. In the sequence 500, each of the readout commands 5081 to 5085 is a readout command which has been transmitted from the host apparatus 120, has been stored in the temporary storage memory 102, and is in a queue to be executed. Each readout command includes the start logical address of the data to be read out and the amount of data to be read out. In the present embodiment, the number of reading commands is five, but the number of commands is not limited to five.

The sequence 502 is a sequence which has been rearranged such that readout commands 5081 to 5085 are to be alternately executed for the nonvolatile memory 100 and the storage medium 114. The readout commands 5081, 5083, and 5085 are to be executed for the nonvolatile memory 100, and the readout commands 5082 and 5084 are to be executed for the storage medium 114. Furthermore, the sequence of the readout commands to be executed for the storage medium 114 has been rearranged by the controller 106 in descending order of rotation waiting time, thereby obtaining the sequence as represented by the sequence 502.

Judgment is made based upon the memory address conversion table 20 whether or not the nonvolatile memory 100 holds the data that corresponds to the logical address included in the readout command. For example, in a case in which the logical address included in the readout command is "450", this logical address is between the start logical address "400" and the ending logical address "500" in the first row of the memory address conversion table 20. Accordingly, judgment is made that the data that corresponds to the logical address "450" is stored in the nonvolatile memory 100. On the other hand, in a case in which the logical address included in the readout command is "550", the range of addresses encompassing the start logical address and the ending logical address does not occur in any row of the memory address conversion table 20. Data that has not been written to the nonvolatile memory 100 has been written to the storage medium 114. Accordingly, it can be assumed that the data that corresponds to the logical address "550" is not stored in the nonvolatile memory 100, but is stored in the storage medium 114.

According to the sequence 502, the controller 106 transmits the data that corresponds to the logical address included in the readout command 5081 from the nonvolatile memory 100 to the host apparatus 120. At the same time, the controller 106 reads out, from the storage medium 114, the data that corresponds to the logical address included in the readout command 5084, and transmits the data thus read out to the temporary storage memory 102. The reason why the data is transmitted from the storage medium 114 to the temporary storage memory 102 during the transmission of the data from the nonvolatile memory 100 to the host apparatus 120 is to avoid a loss of readout time in the data readout operation of the storage medium 114 due to the rotation waiting time etc.

The sequence 504 is a sequence of readout commands after the readout command 5081 has been executed. The controller 106 removes the readout command 5081 thus executed, thereby obtaining a sequence as represented by the sequence 504. The data stored in the storage medium 114, which corresponds to the readout command 5084, has already been transmitted to the temporary storage memory 102. With such an arrangement as described above, the controller 106 transmits the data read out from the nonvolatile memory 100 to the host apparatus 120 using the waiting time that occurs in the readout operation for reading out the data stored in the storage medium 114. This improves the readout efficiency in the data readout operation. After the data transmission, the controller 106 removes the readout command 5084 from the sequence 504.

Figure 9:
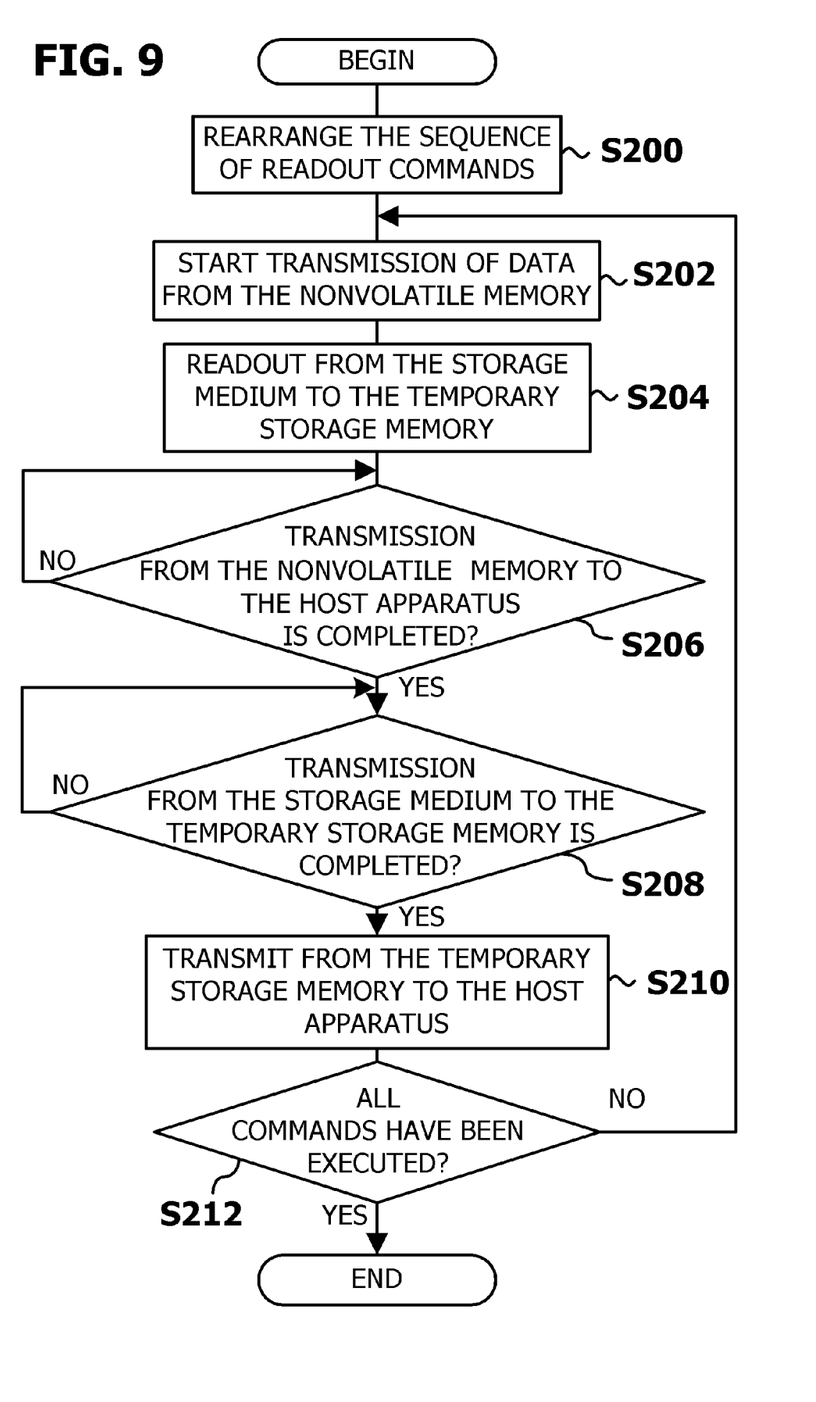
FIG. 9 is a flowchart which illustrates data readout processing.

FIG. 9 is a flowchart which illustrates the data readout operation of the storage device 90.

In a case in which the number of readout commands stored in the temporary storage memory 102 becomes two or more, the controller 106 rearranges the sequence of readout commands which have been transmitted from the host apparatus 120 and which have been stored in the temporary storage medium 102. In the case of the sequence 500, the controller 106 rearranges the sequence such that the readout commands 5081 to 5085 are to be alternately executed for the nonvolatile memory 100 and the storage medium 114. Also, the controller 106 may rearrange the sequence of readout commands to be executed for the storage medium 114 in descending order of waiting time (S200). Furthermore, in a case in which a new readout command is written to the temporary storage memory 102 during the subsequent readout steps, the controller 106 performs the aforementioned rearrangement processing after the execution of the readout command which was being executed when the new writing command was transmitted.

The controller 106 executes the readout commands starting with the readout command located at the top of the sequence of readout commands thus rearranged. In the case of the sequence 502, of the readout commands 5081 to 5085 thus rearranged, the controller 106 executes the readout command 5081, which is located at the top of the sequence, and starts the transmission of data thus read out from the nonvolatile memory 100 to the host apparatus 120 (S202).

Subsequently, the controller 106 executes the next readout command, which is the next command from the aforementioned readout command for the nonvolatile memory 100, for the storage medium 114, and writes the data thus read out to the temporary storage memory 102. In the case of the sequence 502, the controller 106 executes the readout command 5084, which is the next command from the readout command 5081, and writes the data thus readout from the storage medium 114 to the temporary storage memory 102 (S204).

The controller 106 is maintained in the waiting state until the data transmission from the nonvolatile memory 100 to the host apparatus 120 is completed (in a case of "NO" in S206). After the data transmission, the controller 106 checks the state of the data transmission from the storage medium 114 (in a case of "YES" in S206).

The controller 106 is maintained in the waiting state until the completion of the data transmission from the storage medium 114 to the temporary storage memory 102 (in a case of "NO" in S208). After the completion of the data transmission from the storage medium 114 to the temporary storage memory 102 (in a case of "YES" in S208), the controller 106 transmits the data thus transmitted from the temporary storage memory 102 to the host apparatus 120. In the case of the sequence 502, the controller 106 transmits the data that corresponds to the readout command 5084 from the temporary storage memory 102 to the host apparatus 120. Furthermore, the controller 106 removes the readout commands 5081 and 5084 which have been executed (S210).

In a case in which there is an unexecuted readout command in the rearranged sequence of data readout commands stored in the temporary storage memory 102, the controller 106 starts the processing again following Step S202.

In a case in which all the readout commands included in the rearranged sequence stored in the temporary storage memory 102 have been executed (in a case of "YES" in S212), the readout processing ends.

As described above, the controller 106 executes the readout commands for the storage medium 114 and the nonvolatile memory 100 in parallel. The controller 106 repeatedly performs the processing until all the readout commands are completed. The controller 106 transmits data from the nonvolatile memory 100 to the host apparatus 120 using the waiting time that occurs in the data readout operation for reading out data stored in the storage medium 114, thereby improving the readout efficiency in the data readout operation.

In a case in which flash memory is employed as the nonvolatile memory 100, the data writing operation, i.e., the data removal operation, is performed in increments of blocks. An increase in the number of times data is rewritten to each block deteriorates the storage performance of each memory cell. Accordingly, after the number of times data is repeatedly rewritten to a certain block exceeds a predetermined number, it becomes highly possible that the data stored in the aforementioned block in the nonvolatile memory 100 according to a writing command issued from the host apparatus 120 cannot be correctly read out.

Figure 10:
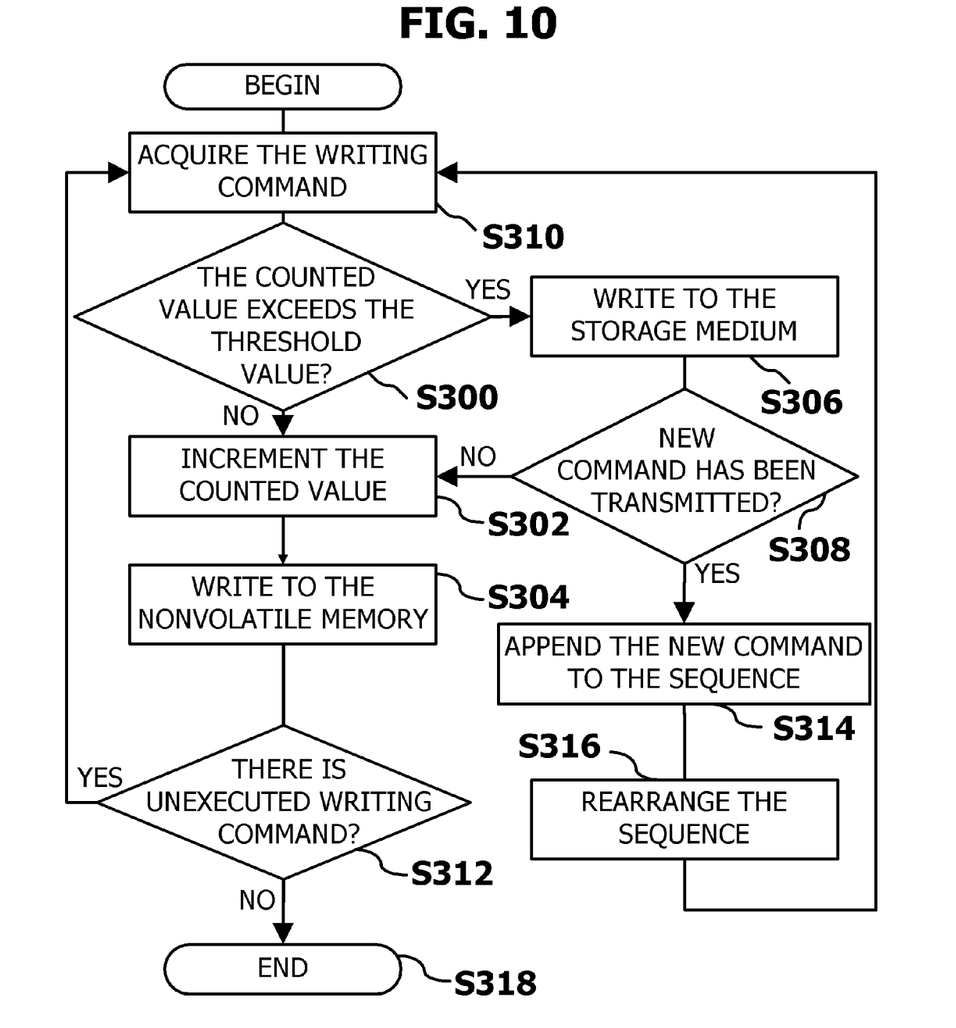
FIG. 10 is a flowchart which illustrates data writing processing.

FIG. 10 is a flowchart which illustrates the writing processing in a case in which the number of times data has been repeatedly written to the nonvolatile memory 100 has exceeded a threshold number.

The controller 106 instructs the temporary storage memory 102 to store a sequence of writing commands transmitted from the host apparatus 120, and performs rearrangement processing. The controller 106 acquires a writing command from the sequence thus rearranged. In the case of the sequence 300, the controller 106 rearranges the sequence so as to reduce the waiting time, thereby obtaining a rearranged sequence as represented by the sequence 302. The controller 106 acquires the writing command 3061 from the sequence 302 thus rearranged (S310).

The counter 108 counts the number of times data has been written, i.e., the number of times data has been erased, in increments of blocks in the nonvolatile memory 100. The counted value and the threshold value are stored in a nonvolatile storage region such as a storage region in the controller 106. Here, the threshold value can be determined based upon the number of times that the nonvolatile memory 100 is rewritable. With such an arrangement, in a case in which the number of times data has been rewritten has exceeded the threshold value, it can be predicted that it is highly possible that the data stored in the nonvolatile memory 100 cannot be read out.

The controller 106 compares the counted value counted by the counter 108 with the threshold value thus set. In a case in which the counted value has exceeded the threshold value (in a case of "YES" in S300), the controller 106 writes the data to the storage medium 114, instead of writing the data to the nonvolatile memory 100.

In the case of the sequence 302, the controller 106 writes the data that corresponds to the writing command 3061 to the storage medium 114 (S306). In a case in which the counted value has not exceeded the threshold value (in a case of "NO" in S300), the controller 106 instructs the counter 108 to increment the counted value (S302), and writes the data to the nonvolatile memory 100. In the case of the sequence 302, the controller 106 writes the data that corresponds to the writing command 3061 to the nonvolatile memory 100 (S304).

After the execution of Step S306, the controller 106 checks whether or not a new writing command has been transmitted from the host apparatus 120. In a case in which a new writing command has been transmitted (in a case of "YES" in S308), the controller 106 appends the new writing command to the sequence stored in the temporary storage memory 102 (S314), and rearranges the sequence of the writing commands (S316). In a case in which a new writing command has been issued, the controller 106 judges that the load of the writing processing is heavy, and executes the steps following Step S310 without writing data to the nonvolatile memory 100.

On the other hand, in a case in which a new writing command has not been transmitted (in a case of "NO" in S308), the controller 106 instructs the counter 108 to increment the counted value (S302). The controller 106 also writes the data, which has been written to the storage medium 114 in Step S306, to the nonvolatile memory 100 (S304). The reason why the same data is also stored in the nonvolatile memory 100 is to increase the data readout efficiency using the high performance of the nonvolatile memory 100 in the random access operation. It should be noted that, in some cases, the data stored in the nonvolatile memory 100 cannot be read out after the counted value counted by the counter 108 has exceeded the threshold value. In order to solve this problem, the same data is also stored in the storage medium 114. Furthermore, when the memory address conversion table 20 is updated, the controller 106 writes "1" to the column 213 in the row that corresponds to the data to be written. This flag is written in order to specify that the same data is stored in both the nonvolatile memory 100 and the storage medium 114.

Also, in Step S304, the operation for storing the data in the nonvolatile memory 100 may be omitted. With such an arrangement, in a case in which a great amount of data is to be written, the data writing time can be omitted for the nonvolatile memory 100, thereby providing high-speed data writing operation of the storage device. In this case, there is no need to update the memory address conversion table 20.

In a case in which there is any unexecuted writing command remaining in the sequence of writing commands, the controller 106 again executes the steps following Step S310 (in a case of "YES" in S312). In a case in which there is no writing command remaining in the sequence (in a case of "NO" in S312), the controller 106 ends the writing processing (S318).

Figure 11:
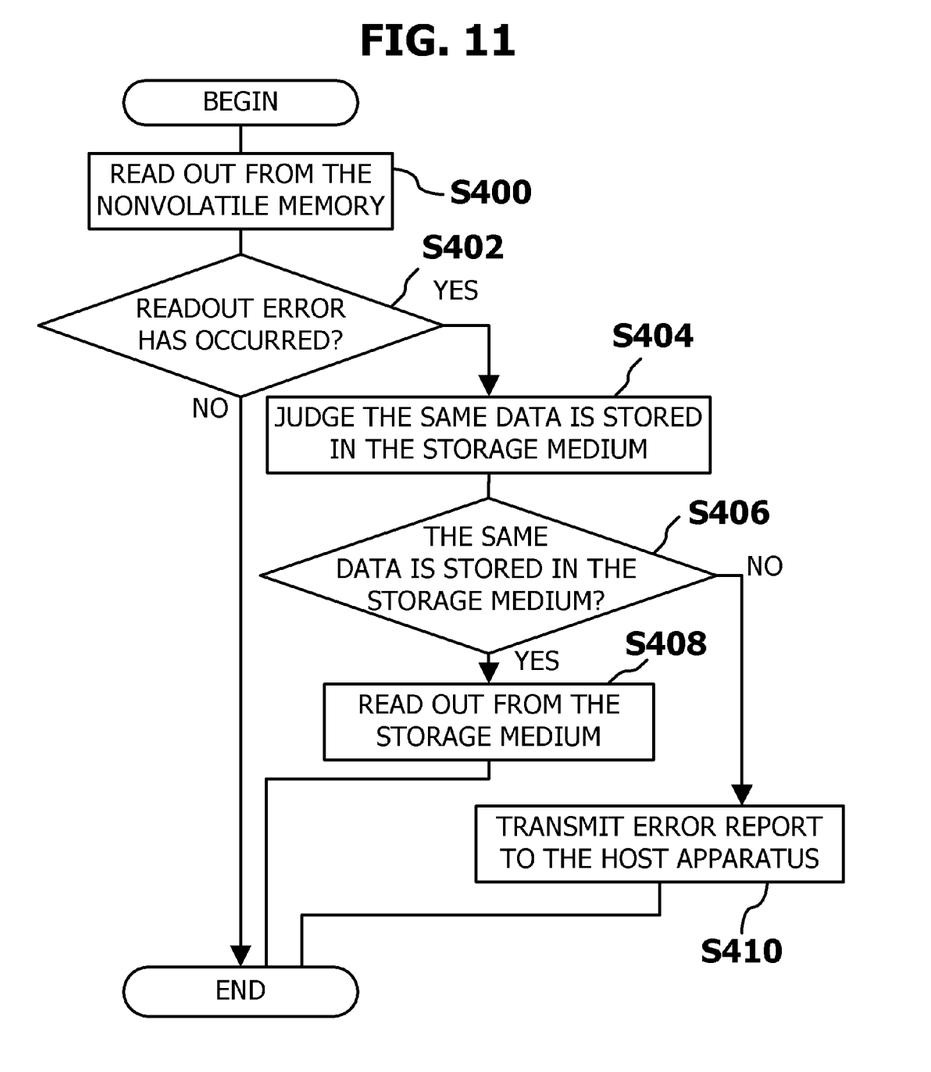
FIG. 11 is a flowchart which illustrates data readout processing.

FIG. 11 is a flowchart which illustrates the data readout processing in a case in which the same data has been stored in the nonvolatile memory 100 and the storage medium 114 according to the steps included in FIG. 10.

In a case in which the controller 106 has judged that the data that corresponds to the readout command transmitted from the host apparatus 120 matches any item of the data stored in the nonvolatile memory 100, the controller 106 reads out the data stored in the nonvolatile memory 100 (S400).

The controller 106 judges whether or not a readout error has occurred in the data thus read out. In a case in which no error has occurred (in a case of "NO" in S402), the data thus read out is transmitted to the host apparatus 120, and ends the readout processing. The controller 106 judges whether or not an error has occurred by making a comparison between a CRC (Cyclic Redundancy Check) code, which has been generated by the controller 106 in the data writing operation and which has been stored in the nonvolatile memory 100 along with the data, and a CRC code generated in the data readout operation. The CRC code is generated by the memory controller 104. The CRC code is a code used to check whether or not there is a difference between the data read out from the nonvolatile memory 100 and the data which has been written to the nonvolatile memory 100.

In a case in which the controller 106 has judged that an error has occurred (in a case of "YES" in S402), the controller 106 checks whether or not the same data is stored in the storage medium 114. In a case in which the flag data in the column 213 in the memory address conversion table 20 matches "1", the controller 106 judges that the same data is stored in the storage medium 114 (S404). In a case in which the controller 106 has judged that the same data is stored in the storage medium 114 (in a case of "YES" in S406), the controller 106 reads out this data from the storage medium 106 (S408), and transmits the data to the host apparatus 120, whereupon the readout processing ends.

In a case in which the controller 106 has judged that the storage medium 114 does not store the same data (in a case of "NO" in S406), the controller 106 transmits an error report to the host apparatus 120 (S410), and ends the readout processing.

On the other hand, in a case in which the same data has not been written to the nonvolatile memory 100 after the counted value has exceeded the threshold value, the controller 106 immediately accesses the storage medium 114 without executing the aforementioned steps. With such an arrangement, the data readout processing steps can be omitted, thereby increasing the data writing rate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage device comprising:
   a storage unit including a rotating storage medium and a writing head for writing data into the rotating storage medium via the writing head;
   a nonvolatile memory;
   a temporary storage memory for storing a plurality of writing commands temporarily; and
   a controller for executing the plurality of writing commands so as to selectively write data into the storage unit or the nonvolatile memory,
   wherein the controller rearranges the plurality of writing commands stored in the temporary storage memory in accordance with efficiency for executing the writing commands to write data into the storage unit, sequentially executes the plurality of the rearranged writing commands in descending order, and executes in parallel at least one of the writing commands that has not been executed to write data into the nonvolatile memory until all the data to be written in accordance with the plurality of writing commands are stored in either the storage unit or the nonvolatile memory.

2. The storage device of claim 1, wherein the controller rearranges the writing commands in accordance with a period of time for the movement of the writing head when a writing command is executed.

3. The storage device of claim 1, wherein the controller rearranges the writing commands in accordance with a data writing time for writing data into the storage unit.

4. The storage device of claim 1, wherein the controller rearranges the writing commands in accordance with a sum of a period of time for the movement of the writing head when a writing command is executed and a data writing time for writing data into the storage unit.

5. The storage device of claim 1:
   wherein the controller monitors the number of times data is written to the nonvolatile memory in increments of regions; and
   wherein, in case in which the number of times data has been written is greater than a predetermined permission number with respect to a region to which data is to be written when a writing command is executed, the controller omits to write to the region and executes the next writing command in ascending order.

6. The storage device of claim 1:
   wherein the controller monitors the number of times data that is written to the nonvolatile memory in increments of regions; and
   wherein, in case in which the number of times data has been written is greater than a predetermined permission number with respect to a region to which data is to be written when a writing command is executed, the controller writes the data to the region and executes the next writing command in ascending order.

7. The storage device of claim 1, wherein the controller executes the plurality of writing commands for the storage unit in descending order, in case any writing command has already been executed for the nonvolatile memory, the controller starts an execution of next writing command from the writing command which has already been executed.

8. The storage device of claim 1, wherein the other writing commands are the plurality of writing commands to be executed in ascending order.

9. The storage device of claim 1, wherein the nonvolatile memory stores a memory address conversion table for storing a logical addresses in accordance with a data written into the nonvolatile memory and a physical addresses of the nonvolatile memory storing the data.

10. The storage device of claim 9, wherein the memory address conversion table includes flag data which specifies whether or not the storage unit stores the same data which stored in the nonvolatile memory.

11. A data storing method for a storage device which includes a storage unit including a rotating storage medium and a writing head for writing data into the rotating storage medium via the writing head, a nonvolatile memory, and a temporary storage memory for storing a plurality of writing commands temporarily comprising:
    rearranging the plurality of writing commands stored in the temporary storage memory in accordance with efficiency for executing the writing commands to write data into the storage unit;
    executing the plurality of the rearranged writing commands sequentially in descending order; and
    executing in parallel at least one of the writing commands that has not been executed to write data into the nonvolatile memory until all the data to be written in accordance with the plurality of writing commands are stored in either the storage unit or the nonvolatile memory.

12. The data storing method of claim 11, wherein the plurality of writing commands for the storage unit is executed in descending order, in case any writing command has already been executed for the nonvolatile memory, an execution of next writing command from the writing command which has already been executed is started.

13. The data storing method of claim 11, wherein the other writing commands are the plurality of writing commands to be executed in ascending order.

* * * * *